United States Patent [19]

Croup

[11] 3,993,345
[45] Nov. 23, 1976

[54] ENCLOSURE FOR AUTOMOBILE TRUNK-MOUNTED LOUDSPEAKER

[75] Inventor: Robert E. Croup, Indianapolis, Ind.

[73] Assignee: Acoustic Fiber Sound Systems, Inc., Indianapolis, Ind.

[22] Filed: Oct. 29, 1975

[21] Appl. No.: 626,729

[52] U.S. Cl. .............................. 296/37.16; 181/150; 181/199
[51] Int. Cl.² .................................................. B60R 5/00
[58] Field of Search ........................... 181/148–156, 181/199; 296/37 R

[56] References Cited
UNITED STATES PATENTS

| | | | |
|---|---|---|---|
| 1,930,577 | 10/1933 | Atkinson | 181/148 XL |
| 3,757,889 | 9/1973 | Everitt | 181/156 |
| 3,811,532 | 5/1974 | Everitt | 181/156 |
| 3,848,696 | 11/1974 | Everitt | 181/156 |
| 3,882,962 | 5/1975 | Ripple | 181/154 |
| 3,941,207 | 3/1976 | Croup | 181/199 |

Primary Examiner—M. H. Wood, Jr.
Assistant Examiner—Gene A. Church
Attorney, Agent, or Firm—Prangley, Dithmar, Vogel, Sandler & Stotland

[57] ABSTRACT

A loudspeaker enclosure for an automobile trunk-mounted open loudspeaker carried beneath the rear package shelf of the automobile comprises a closed housing having an opening in the top wall thereof shaped and dimensioned to permit the housing to be fitted over the loudspeaker, with the housing top wall disposed snugly against the underside of the rear package shelf, and an elastic strap for releasably holding the housing in place over the loudspeaker. The housing includes two inner box-like members each comprising a plurality of hingedly interconnected panels formed from a single piece of corrugated fiberboard, and an outer plastic shell, the inner corrugated members and the outer shell all being fastened together in a nested configuration, so that each wall of the housing except the top wall has at least two layers of corrugations. A cushion is provided between the rear package shelf and the top wall of the housing.

20 Claims, 6 Drawing Figures

ENCLOSURE FOR AUTOMOBILE TRUNK-MOUNTED LOUDSPEAKER

BACKGROUND OF THE INVENTION

The present invention relates generally to improvements in loudspeaker enclosures, and specifically to the provision of an enclosure for an automobile rear seat loudspeaker of the type which is mounted in the automobile trunk beneath the rear package shelf.

While loudspeaker assemblies including a loudspeaker mounted within a suitable enclosure for enhancing the quality of the sound from the loudspeaker are well-known in the art, the loudspeaker used in automobiles are generally not provided with enclosures. In particular, loudspeakers provided as standard or original equipment in new automobiles are typically not provided with enclosures, generally because of the space limitations in the automobile. Such automobile loudspeakers are typically flush-mounted on the rear package shelf behind the rear seat, with the loudspeaker suspended beneath the rear package shelf and projecting into the automobile trunk space. The sound from such open loudspeakers emanates from both the front and rear surfaces thereof and is free to bounce about randomly, thereby seriously impairing the quality of the sound emanating from the speaker system and often destroying stereo effect in a stereo system. Furthermore, road noise is often picked up through the speaker cone of such open loudspeakers, and the open loudspeakers are subject to dust and dirt accumulation, impact damage when the automobile trunk is being loaded and unloaded, and the possibility of the speaker cone being blown out when the trunk lid is slammed shut.

If an automobile owner wishes to obtain a high quality sound system in his automobile, he must install the conventional loudspeaker assemblies consisting of a loudspeaker mounted within a conventional enclosure, which loudspeaker assemblies are relatively expensive and may be in addition to original equipment open speakers which do not provide the desired acoustic performance. Such assemblies are typically mounted on top of the rear package shelf of the automobile and may tend to obscure the driver's vision through the rear window of the automobile. Lightweight and inexpensive loudspeaker assemblies having enclosures constructed of corrugated fiberboard are known in the art, examples of such prior structures being shown in U.S. Letters Pat. No. 3,757,889, issued Sept. 11, 1973, U.S. Pat. No. 3,811,532, issued May 21, 1974, and U.S. Pat. No. 3,848,696, issued Nov. 19, 1974, each of which patents was issued to Scott F. Everitt, and each of which is assigned to the assignee of the present invention. However, these and all other prior art loudspeaker assemblies which include enclosures are of the type wherein the loudspeaker is mounted within the enclosure, with the enclosure providing the support or mounting base for the loudspeaker.

SUMMARY OF THE INVENTION

The present invention provides an enclosure for an open loudspeaker which has been premounted in a vehicle, and particularly for automobile trunk-mounted loudspeakers carried beneath the rear package shelf of an automobile. The enclosure is of lightweight and inexpensive construction, and is capable of being mounted in place extremely simply without the use of tools, while at the same time having good acoustical qualities, whereby improved acoustical performance can be obtained from original equipment open loudspeakers, thereby obviating the purchase of additional conventional enclosed speaker assemblies.

This is accomplished in the present invention, and it is an object of the present invention to accomplish these desired results by providing an enclosure for an automobile trunkmounted open loudspeaker carried beneath the rear package shelf of an automobile, the enclosure comprising a plurality of walls interconnected to form a closed housing, one of the walls having an opening therein shaped and dimensioned for receiving the associated loudspeaker therethrough and into the housing to permit the housing to be fitted over the associated loudspeaker to a mounting position, the one wall being disposed snugly against the underside of the associated rear package shelf when the housing is disposed in the mounting position thereof, and mounting means for holding the housing in the mounting position thereof.

In connection with the foregoing object, another object of this invention is to provide a loudspeaker enclosure of the type set forth, wherein the mounting means includes a strap disposed beneath the housing and means releasably attaching the strap to the associated rear package shelf for releasably holding the housing in the mounting position thereof.

Another object of this invention is to provide an enclosure of the type set forth, wherein each of the walls other than the one wall includes at least two layers of corrugated material and an outer layer of decorative and protective material, the outer layers of the other walls being formed as a single integral piece providing an outer shell completely covering the outer surfaces of the other walls.

In connection with the foregoing object, it is another object of this invention to provide an enclosure of the type set forth, wherein the one wall and the inner layers of the other walls are all formed from a single inner corrugated member including a plurality of hingedly interconnected panels, the outer layers of corrugated material of the other walls being formed from a single outer corrugated member including a plurality of hingedly interconnected panels, and fastening means holding the panels assembled with respect to each other to provide integral inner and outer corrugated members for the enclosure.

Still another object of this invention is to provide an enclosure of the type set forth, which comprises first and second generally box-like members respectively formed of first and second continuous sheets of folded corrugated material, and a third member integrally formed of a single piece of decorative and protective material, the first, second and third members all being nested together in an assembled configuration to form a closed housing.

Further features of the invention pertain to the particular arrangement of the parts of the loudspeaker enclosure whereby the above-outlined and additional operating features thereof are attained.

The invention, both as to its organization and method of operation, together with further objects and advantages thereof, will best be understood by reference to the following specification taken in connection with the accompanying drawings.

DESCRIPTION OF THE PREFERRED EMBODIMENT

Figure 1:
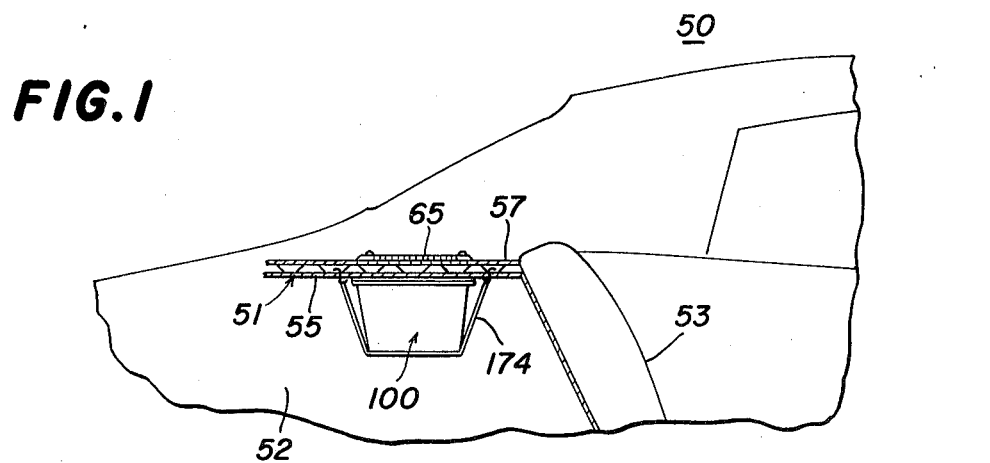
FIG. 1 is a fragmentary side elevational view in partial section of the rear portion of an automobile having an enclosure constructed in accordance with and embodying the features of the present invention mounted in place over a trunk-mounted open loudspeaker.
Figure 3:
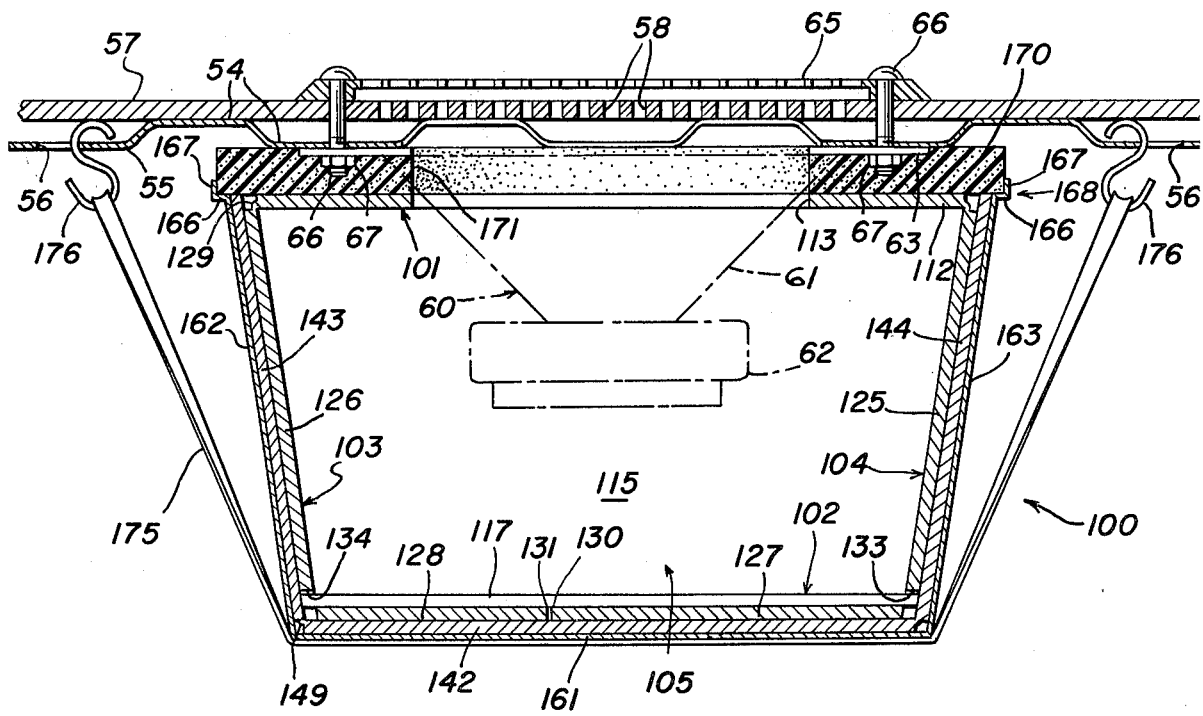
FIG. 3 is a further enlarged view in vertical section of the loudspeaker enclosure of the present invention shown mounted in place over a trunk-mounted loudspeaker, with the section through the enclosure taken along the line 3—3 in FIG. 2.

Referring now to FIGS. 1 and 3 of the drawings, there is illustrated an automobile generally designated by the numeral 50, of the type provided with a trunk space 52 defined by a trunk lid stamping 51 behind the rear seat 53, all in a conventional well-known manner. A portion of the trunk lid stamping 51 defines a flat rear package shelf 55 behind the rear seat 53 and beneath the rear window of the automobile 50, in a well-known manner, the rear package shelf 55 being of corrugated construction having corrugations 54, and also being provided with apertures 56 therethrough at spaced-apart locations. A shelf panel 57 overlies the rear package shelf 55 and is provided with perforations 58 therethrough in an area beneath which a loudspeaker, generally designated by the numeral 60, is to be mounted, in order to facilitate passage of the sound waves through the shelf panel 57.

The loudspeaker 60 is provided with a speaker cone 61 and an electromagnet structure 62, the wide end of the cone 61 being provided with a peripheral mounting flange 63 extending radially outwardly thereform. Preferably, a suitably-shaped aperture is cut in the rear package shelf 55 in the area where the loudspeaker 60 is to be mounted immediately beneath the perforations 58 in the shelf panel 57. A perforated grill 65 is mounted on the top surface of the shelf panel 57 immediately overlying the perforations 58. Bolts 66 extend through complementary openings in the grill 65, the shelf panel 57, the rear package shelf 55 and the loudspeaker mounting flange 63 and cooperate with nuts 67 to hold the members assembled together and firmly to mount the loudspeaker 60 in place. The electromagnet 62 of the loudspeaker 60 is connected by suitable conductors (not shown) to a signal source such as a radio receiver, tape deck, record player or the like. In the standard automobile loudspeaker installation of the prior art, the loudspeaker would remain uncovered and be operated without an enclosure.

Referring now also to FIGS. 2 and 4 through 6 of the drawings, there is illustrated an enclosure, generally designated by the numeral 100, constructed in accordance with an embodying the features of the present invention for enclosing the loudspeaker 60. The enclosure 100 is generally box-like in shape and substantially trapezoidal in transverse cross section. The enclosure 100 includes a rectangular top wall 101, a rectangular bottom wall 102, opposed trapezoidal side walls 103 and 104 and opposed trapezoidal end walls 105 and 106. Each of the walls 103 through 106 is formed of two layers of corrugated material, while the wall 101 is formed of one layer of corrugated material, and the wall 102 is formed of three layers of corrugated material. The outer surfaces of the walls 102 through 106 are preferably provided with a decorative and protective covering, all as will be described more fully hereinafter.

Figure 4:
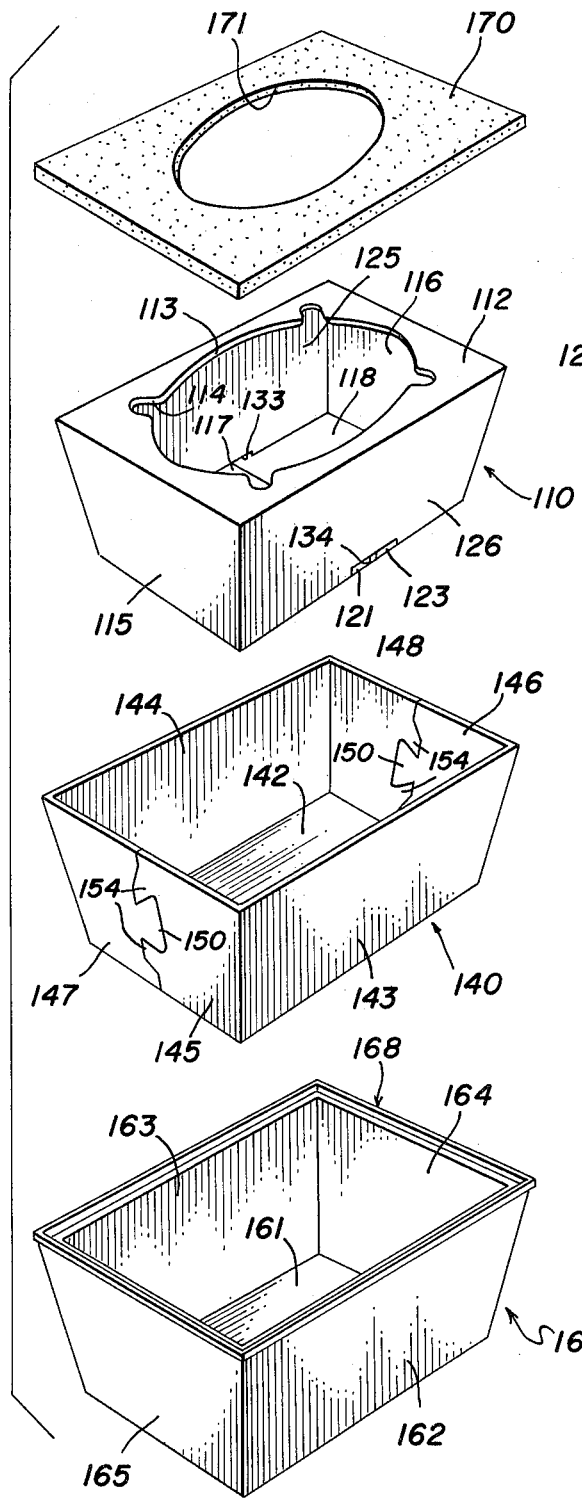
FIG. 4 is an exploded perspective view of the several members of the loudspeaker enclosure of the present invention.
Figure 5:
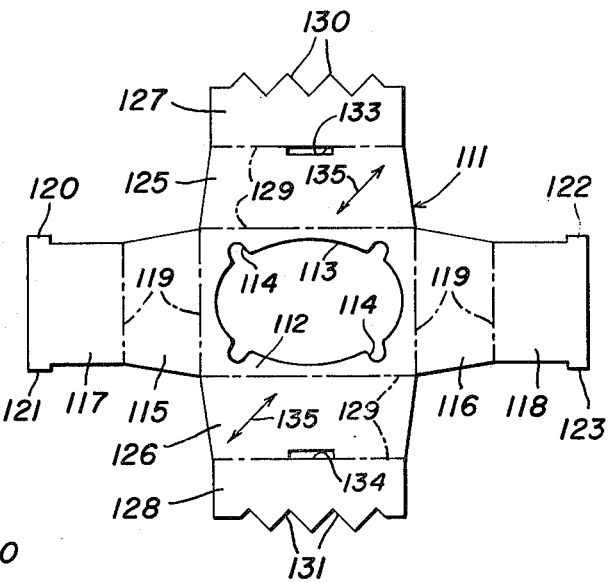
FIG. 5 is a top plan view of one of the corrugated members of the enclosure, shown laid out flat in its unfolded condition.

In accordance with the present invention, the top wall 101 and the inner layers of the several walls 102 through 106 are provided by a single unitary inner member, generally designated by the numeral 110, the construction of which is best illustrated in FIGS. 4 and 5 of the drawings. The inner member 110 consists of a single sheet 111 of corrugated material, preferably corrugated fiberboard, having the usual pair of liner sheets with corrugations disposed therebetween and adhesively secured thereto. The sheet 111 is in turn shaped, scored and has cutouts therein providing and defining the several parts thereof. There is provided a generally rectangular top panel 112 that forms the top wall 101 and has centrally thereof a generally oval opening 113 dimensioned to accommodate reception therethrough of the cone 61 and electromagnet 62 of the loudspeaker 60. Preferably, the opening 113 has four arcuate lobes disposed generally adjacent to the four corners of the top panel 112 for accommodating the mounting bolts 66 and nuts 67 of the loudspeaker 60, as will be described more fully below.

Hingedly connected to the end edges of the panel 112 are two generally trapezoidal end panel 115 and 116 which respectively form the inner layers of the end walls 105 and 106. Respectively hingedly connected to the outer edges of the end panel 115 and 116 are inner bottom panel sections 117 and 118, the bottom panel section 117 being provided at the side edges of the distal end thereof with tabs or ears 120 and 121, and the bottom panel section 118 being provided at the side edges of the distal end thereof with tabs or ears 122 and 123.

Also respectively hingedly connected to the opposite side edges of the front panel 112 are two generally trapezoidal side panel 125 and 126, which respectively form the inner layers of the side walls 104 and 103. The outer edges of the side panels 125 and 126 are respectively hingedly connected to outer bottom panel sections 127 and 128, the outer edges of which are respectively formed with teeth or serrations 130 and 131, the teeth 130 on the bottom panel section 127 being shaped complementary to the teeth 131 on the bottom panel section 128.

Low knife cuts along dashed lines 119 and 129 form the hinged connections between the front panel 112 and the end panels 115 and 116 and side panels 126 and 127, and also form the hinged connections between the latter panels and the bottom panel sections 117, 118, 127, and 128. The low knife cuts 119 and 129, as best illustrated in FIG. 3, extend through the lower or outer one of the liners of the corrugated material and through the corrugated layer, but do not go through the liner disposed inwardly in FIG. 3, that uncut liner providing the hinged connections between the various panels. In addition, the side panels 125 and 126 are respectively provided with elongated rectangular slots 133 and 134 centrally of the outer edges thereof adjacent to the associated low knife cuts 129.

In assembling the enclosure 100, the end panels 115 and 116 of the inner member 110 are first folded downwardly and slightly inwardly with respect to the top panel 112, and the bottom panel sections 117 and 118 are then folded inwardly with respect to the end panels 115 and 116 to positions substantially parallel to the top panel 112, the distal outer edges of the bottom panel sections 117 and 118 abutting to form an inner bottom panel. Then the side panels 125 and 126 are folded downwardly and slightly inwardly with respect to the top panel 112, and the bottom panel sections 127 and 128 are folded inwardly with respect to the side panels 125 and 126 and beneath the bottom panel sections 117 and 118, the teeth 130 and 131 of the bottom panel sections 127 and 128 abutting and mating to form an intermediate bottom panel. When the side panels 125 and 126 and the bottom panel sections 127 and 128 are folded into position as described, the tabs 120 and 122 of the bottom panel sections 117 and 118 extend through the slot 133, while the tabs 121 and 123 extend through the slot 134, thereby holding the inner member 110 folded in its assembled condition illustrated in FIG. 4. The corrugations of the sheet 111 extend in the direction indicated by the arrows 135 in FIG. 5.

Figure 6:
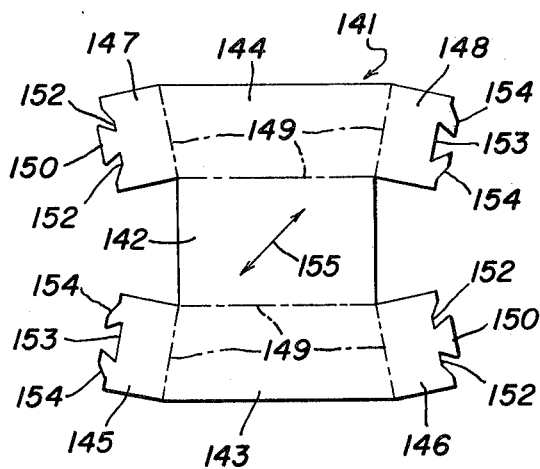
FIG. 6 is a view similar to FIG. 5 illustrating the other corrugated member of the enclosure, shown laid out flat in its unfolded condition.

The outer corrugated layers of the several walls 102 through 106 are provided by a single unitary outer corrugated member 140, the construction of which is best illustrated in FIGS. 4 and 6 of the drawings. The outer corrugated member 140 consists of a single sheet 141 of corrugated material, preferably corrugated fiberboard, having the usual pair of liner sheets with corrugations disposed therebetween and adhesively secured thereto. The sheet 141 is in turn shaped, scored and has cutouts therein providing and defining the several parts thereof. There is provided a generally rectangular bottom panel 142 that forms the outer corrugated layer of the bottom wall 102. Respectively hingedly connected to the side edges of the bottom panel 142 are two generally trapezoidal side panels 143 and 144 which respectively form the outer corrugated layers of the side walls 103 and 104. Respectively hingedly connected to the side edges of the side panel 143 are end panel sections 145 and 146, and respectively hingedly connected to the side edges of the side panel 114 are end panel sections 147 and 148.

Low knife cuts along the dashed lines 149 form the hinged connections between the bottom panel 142 and the side panels 143 and 144, and between the side panels 143 and 144 and the end panel sections 145 through 148. The outer side edge of each of the end panel sections 146 and 147 is provided with a key tab 150 flanked at the opposite side edges thereof by notches 152. Respectively formed in the outer side edges of each of the end panel sections 145 and 148 is a notch 153 having tabs 154 at the opposite side edges thereof. The corrugations of the sheet 141 extend in a direction indicated by the arrow 155 in FIG. 6.

In assembly of the enclosure 100, the side panels 143 and 144 are folded upwardly with respect to the bottom panel 142, and the end panel sections 145 and 147 are then folded inwardly toward each other, and the key tab 150 is inserted in the mating notch 153, with the tabs 154 being inserted in the mating notches 152 in a dovetail interlocking arrangement, thereby to form one generally trapezoidal end panel which forms the outer corrugated layer of the end wall 105. In like manner, the end panel sections 146 and 148 are folded inwardly toward each other and the key tab 150 is inserted in the mating notch 153, with the tabs 154 received in the mating notches 152 in a dovetail interlocking arrangement, thereby to form another generally trapezoidal end panel which forms the outer corrugated layer of the end wall 106. The interconnection between the key tabs 150 and notches 153 and the tabs 154 and notches 152 serve to hold the intermediate member 140 in the assembled configuration illustrated in FIG. 4.

The enclosure 100 also includes an outer shell 160 which is formed integrally of a single piece of material, as by molding, the material preferably being an impactresistant plastic which can be provided in decorative patterns and colors. The outer shell 160 includes a bottom wall 161, two generally trapezoidal opposed side walls 162 and 163 and two opposed generally trapezoidal end walls 164 and 165. Extending laterally outwardly from the upper edge of each of the walls 162 through 165 substantially parallel to the bottom wall 161 and running continuously around the periphery of the shell 160 is a short flange 166 being provided at the outer edge thereof with an upwardly extending short flange 167, the flanges 166 and 167 cooperating to define a seat 168 for a purpose to be described below.

Figure 2:
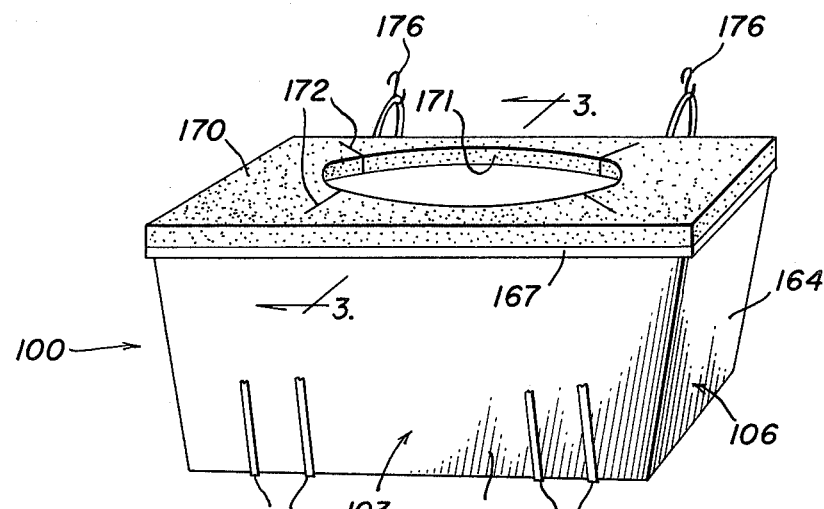
FIG. 2 is an enlarged front perspective view of the enclosure of the present invention.

The corrugated members 110 and 140 and the outer shell 160 are all similarly shaped and are dimensioned so that they may be nested one within another. More particularly, in assembly of the enclosure 100, the outer corrugated member 140 nests within the outer shell 160 and the inner corrugated member 110 nests within the outer corrugated member 140, with the bottom and side and end panels of the outer corrugated member 140 being respectively disposed in back-to-back engagement with and being adhesively attached to the corresponding panels of the inner member 110 and the corresponding walls of the outer shell 160, thereby to form a housing as illustrated in FIGS. 2 and 3.

It will be noted that when thus assembled, the top wall 101 of the enclosure 100 has a single layer of corrugations formed by the top panel 112 of the inner member 110. The side walls 103 and 104 and end walls 105 and 106 each include two layers of corrugations and an outer covering of decorative and protective material, the inner layers being respectively formed by the side panels and end panels of the inner member 110 and the outer layers being respectively formed by the outer corrugated member 140, and the outer covering of protective and decorative material being formed by the walls 162 through 165 of the outer shell 160. The bottom wall 102 includes three layers of corrugations respectively formed by the inner and intermediate bottom panels of the inner member 110 and the bottom panel 142 of the outer corrugated member 140, and a layer of decorative protective material formed by the bottom wall 161 of the outer shell 160.

When the corrugations of the sheets 111 and 141 are disposed in the directions illustrated by the arrows 135 and 155 in FIGS. 5 and 6, the corrugations of the adjacent corrugated layers of the end walls 105 and 106 will extend in directions substantially perpendicular to each other, this crosscorrugation construction providing improved acoustical qualities by reason of suppression of desired sound waves emanating from the rear of the speaker cone 61, all as is more fully explained in the U.S. Pat. No. 2,992,695, issued to Scott F. Everitt on July 18, 1961, and entitled "Loudspeaker Enclosure". It will be understood that the corrugation of the sheet 111 and 141 could be oriented in any desired direction to provide this cross-corrugation feature in others of the walls 102 through 106 of the enclosure 100, as desired.

The enclosure 100 is preferably also provided with a rectangular cushion 170 of resilient spongy material such as urethane foam, and dimensioned to be positioned on top of the top panel 112 of te enclosure 100, and nested in the seat 168 formed by the flanges 166 and 167. The cushion 170 is provided with an oval opening 171 therethrough substantially congruent with the opening 113 in the top wall 101 of the enclosure 100, and may be provided with corner slits 172 adjacent to the lobes 114 of the opening 113 to facilitate the forming of the cushion 170 around the lower ends of the bolts 66 and the nuts 67 of the loudspeaker 60. In use, the cushion 170 is adhesively secured to the upper surface of the top panel 112. Preferably, the bottom surface of the cushion 170 is provided with a layer of pressuresensitive adhesive, which is in turn covered with a release liner (not shown), which may be removed at the time of installation of the enclosure 100 in an automobile by the user, for attaching the cushion 170 to the top panel 112.

In installation of the enclosure 100 in the automobile 50, the cushion 170 is positioned in the seat 168 and adhesively secured to the top panel 112, as described above, and the enclosure 100 is fitted over the loudspeaker 60, with the loudspeaker cone 61 and electromagnet 62 being received through the opening 171 in the cushion 170 and the opening 113 in the top wall 101 of the enclosure 100 and thence into the interior of the enclosure, as best illustrated in FIG. 3. The threaded ends of the bolts 66 and the nuts 67 are received in the cushion 170 at the slits 172, the lobes 114 in the aperature 113 in the top wall 101 permitting passage of the bolts 66 and nuts 67 therethrough in the event that the bolts 66 are unusually long, or incase the cushion 170 is compressed in use tightly against the rear package shelf 55.

In order to hold to enclosure 100 snugly against the underside of the rear package shelf 55, there is provided a pair of mounting straps 174 and 175, each preferably being in the form of an elastic band loop, and four S-hooks 176. Two of the S-hooks are hooked through opposite ends of each of the straps 174 ad 175, the straps 174 and 175 being passed beneath the enclosure 100 and stretched to permit the S-hooks 176 to be hooked in appropriate ones of the apertures 56 and the rear package shelf 55 in order to achieve the desired tension in the straps 174 and 175 snugly to hold the enclosure 100 against the rear package shelf 55 and restrain the enclosure 100 from movement with respect to the loudspeaker 60.

It will be appreciated that this simple mounting arrangement affords great ease of installation and removal of the enclosure 100, without the need for using any tools. Furthermore, the action of the elastic bands 174 and 175 and the resilient cushion 170 serves to accommodate the various jarring movements undergone by the automobile 50 when it is being driven, while at the same time securely holding the enclosure 100 in place with respect to the loudspeaker 60. The snug fit of the enclosure 100 about the mounting plate 63 of the loudspeaker 60, afforded by the cushion 170, serves to seal the interior of the enclosure 100 and prevent the accumulation of dust and dirt inside the enclosure 100 and on the exterior surfaces of the loudspeaker 60, and also minimizes the pickup of road noise through the loudspeaker 60. It will also be appreciated that the impact-resistant outer shell 160 of the enclosure 100 protects the loudspeaker 60 from abuse and damage from contact with objects being loaded into or unloaded from the automobile trunk space 52, and also serves to protect the loudspeaker cone 61 from the sudden air currents and pressure changes when the trunk lid is slammed shut.

While the enclosure 100 has been described as used in the trunk space 52 of an automobile 50, it will, of course, be appreciated that the enclosure 100 may be used in other types of vehicles such as vans, trucks and the like, wherever normally open loudspeaker are utilized in a space sufficient to accommodate the enclosure 100.

From the foregoing, it can be seen that there has been provided a novel and improved enclosure for an automobile loudspeaker, and in particular for an open loudspeaker mounted beneath the rear package shelf of an automobile, which enclosure is of simple and economical construction, and which can be quickly and easily installed and removed without the use of tools.

There has also been provided an enclosure of the character described, which is constructed of multiple layers of acoustic fiberboard surrounded by an impactresistant shell and provided with a cushion for snugly mounting the enclosure in place over the open loudspeaker.

There has also been provided an enclosure of the character described, which is mounted in place by means of elastic bands and hooks, and wherein the multi-layer corrugated walls of the enclosure are formed by two unitary sheets of corrugated fiberboard, cut, scored and folded in a unique configuration.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An enclosure for an automobile trunk-mounted open loudspeaker carried beneath the rear package shelf of an automobile, said enclosure comprising a plurality of walls interconnected to form a closed housing, one of said walls having an opening therein shaped and dimensioned for receiving the associated loudspeaker therethrough and into said housing to permit said housing to be fitted over the associated loudspeaker to a mounting position, said one wall being disposed snugly against the underside of the associated rear package shelf when said housing is disposed in the mounting position thereof, and mounting means for holding said housing in the mounting position thereof.

2. The enclosure set forth in claim 1, wherein said housing is generally box-like in configuration, said walls including layers of corrugated material, said one wall being the top wall of said housing.

3. The enclosure set forth in claim 1, wherein said mounting means is adapted for releasably mounting said housing in the mounting position thereof.

4. An enclosure for an automobile trunk-mounted open loudspeaker carried beneath the rear package shelf of an automobile, said enclosure comprising a plurality of walls interconnected to form a closed housing, one of said walls having an opening therein shaped and dimensioned for receiving the associated loudspeaker therethrough and into said housing to permit said housing to be fitted over the associated loudspeaker to a mounting position, said one wall being disposed snugly against the underside of the associated rear package shelf when said housing is disposed in the mounting position thereof, and mounting means including a strap disposed beneath said housing and means releasably attaching said strap to the associated rear package shelf for releasably holding said housing in the mounting position thereof.

5. The enclosure set forth in claim 4, wherein said mounting means comprises an elastic band disposed beneath said housing, and two hooks respectively connected to the opposite ends of said band for attachment to the associated rear package shelf.

6. The enclosure set forth in claim 4, and further including cushioning means secured to said one wall and disposed in use in contact with the underside of the associated rear package shelf when said housing is disposed in the mounting position thereof.

7. An enclosure for an automobile trunk-mounted open loudspeaker carried beneath the rear package shelf of an automobile, said enclosure comprising a plurality of walls interconnected to form a closed housing, one of said walls having an opening therein shaped and dimensioned for receiving the associated loudspeaker therethrough and into said housing to permit said housing to be fitted over the associated loudspeaker to a mounting position, each of said other walls including at least two layers of corrugated material and an outer layer of decorative and protective material, said outer layers of said other walls being formed as a single integral piece providing an outer shell completely covering the outer surfaces of said other walls, said one wall being disposed snugly against the underside of the associated rear package shelf when said housing is disposed in the mounting position thereof, and mounting means for holding said housing in the mounting position thereof.

8. The enclosure set forth in claim 7, wherein said outer shell is formed of impact-resistant plastic.

9. The enclosure set forth in claim 7, wherein said corrugated material is corrugated fiberboard.

10. The enclosure set forth in claim 7, wherein said housing includes a top wall and a bottom wall and two opposed side walls and two opposed end walls, each of said side walls and end walls having two layers of corrugated material and said bottom wall having three layers of corrugated material, said one wall being said top wall.

11. The enclosure set forth in claim 7, wherein in at least certain ones of said walls the corrugations of each said layer in a wall extend in a direction substantially perpendicular to the direction of the corrugations of adjacent layers in said wall.

12. An enclosure for an automobile trunk-mounted open loudspeaker carried beneath the rear package shelf of an automobile, said enclosure comprising a plurality of walls interconnected to form a closed housing, one of said walls having an opening therein shaped and dimensioned for receiving the associated loudspeaker therethrough and into said housing to permit said housing to be fitted over the associated loudspeaker to a mounting position, each of said other walls including at least two layers of corrugated material, said one wall and the inner layers of said other walls all being formed from a single inner corrugated member including a plurality of hingedly interconnected panels, the outer layers of said other walls being formed from a single outer corrugated member including a plurality of hingedly interconnected panels, fastening means holding said panels assembled with respect to each other to provide integral inner and outer corrugated members for said enclosure, said one wall being disposed snugly against the underside of the associated rear package shelf when said housing is disposed in the mounting position thereof, and mounting means for holding said housing in the mounting position thereof.

13. The enclosure set forth in claim 12, wherein in at least certain ones of said walls the corrugations of each said layer in a wall extend in a direction substantially perpendicular to the direction of the corrugations of adjacent layers in said wall.

14. The enclosure set forth in claim 12, wherein said inner corrugated member includes a top panel having opposed side panels and opposed end panels hingedly connected thereto and bottom panel sections respectively hingedly connected to said opposed panels, two of said bottom panel sections cooperating to provide an inner bottom panel and the other two of said bottom panel sections cooperating to provide an intermediate bottom panel, said inner bottom panel sections having laterally extending tabs thereon and said panels carrying said intermediate bottom panel sections having slots therein receiving said tabs to hold said bottom panel sections and said top and side and end panels in an assembled configuration.

15. The enclosure set forth in claim 12, wherein said outer corrugated member includes a bottom panel having opposed side panels hingedly connected thereto and end panel sections respectively hingedly connected to said opposed side panels, two of said end panel sections cooperating to provide one end panel and the other two of said end panel sections cooperating to provide a second end panel opposed to said one end panel, one end panel section of each of said end panels having a key tab thereon and the other end panel section of each of said end panels having a notch therein cooperating with the associated tab to provide a dovetail interconnection for holding said bottom panel and side panels and end panels in an assembled configuration.

16. The enclosure set forth in claim 12, and further including an outer shell of impact-resistant material attached to and completely covering the outer surfaces of each of said walls.

17. An enclosure for an automobile trunk-mounted open loudspeaker carried beneath the rear package shelf of an automobile, said enclosure comprising a closed box-like first member formed of a first continuous sheet of folded corrugated material, said first member including a top panel and a bottom panel and two opposed side panels and two opposed end panels, said bottom panel including two layers of corrugations, each of said other panels including a single layer of corrugations, an opentop second member formed of a second continuous sheet of folded corrugated material and including a bottom panel and two opposed side panels and two opposed end panels each including a single layer of corrugations, an opentop third member integrally formed of a single piece of decorative and protective material and including a bottom wall and two opposed side walls and two opposed end walls, said first and second and third members being nested together in use in an assembled configuration with said first member disposed within said second member and with said second member disposed within said third member, fastening means holding said first and second and third members together in the assembled configuration thereof with the bottom panel and side panels and end panels of said second member respectively disposed in back-to-back engagement with the corresponding panels and walls of said first and third members to form a closed housing, said top panel having an opening therein shaped and dimensioned for receiving the associated loudspeaker therethrough and into said housing to permit said housing to be fitted over the associated loudspeaker to a mounting position, said top wall being disposed snugly against the underside of the associated rear package shelf when said housing is disposed in the mounting position thereof, and mounting means for holding said housing in the mounting position thereof.

18. The enclosure set forth in claim 17, wherein said fastening means includes adhesive means.

19. The enclosure set forth in claim 17, and further including cushioning means secured to said top panel and disposed in use in contact with the underside of the associated rear package shelf when said housing is disposed in the mounting position thereof.

20. The enclosure set forth in claim 17, and further including cushioning means secured to said top panel and disposed in use in contact with the underside of the associated rear package shelf when said housing is disposed in the mounting position thereof, said mounting means including and elastic band disposed beneath said housing, and two hooks respectively connected to the opposite ends of said band for attachment to the associated rear package shelf.

* * * * *